J. A. FAGUY.
POWER TRANSMISSION FROM A CAR AXLE FOR GENERATING ELECTRIC CURRENT.
APPLICATION FILED MAR. 7, 1910.
993,669.
Patented May 30, 1911.
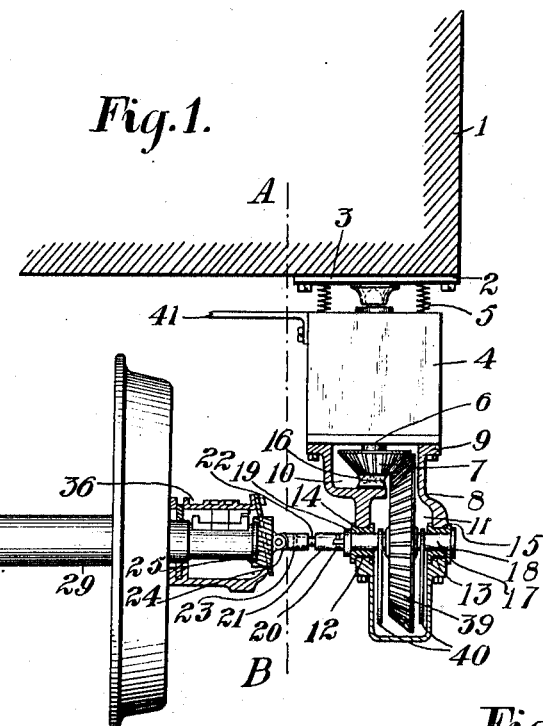
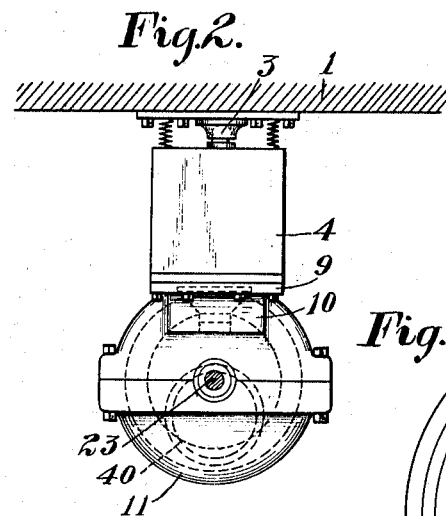
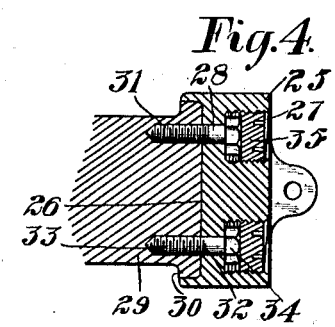
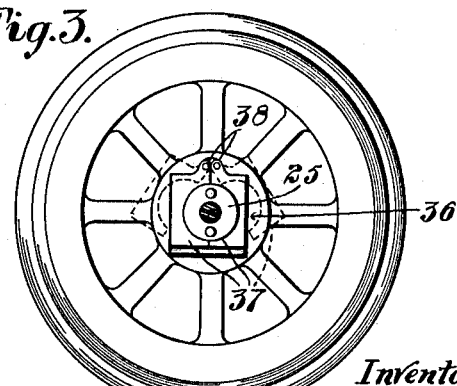
Witnesses.
H. Davis
P. Shee
Inventor
J. A. Faguy
By
Atty.

UNITED STATES PATENT OFFICE.

JOSEPH AUGUSTINE FAGUY, OF MONTREAL, QUEBEC, CANADA.

POWER TRANSMISSION FROM A CAR-AXLE FOR GENERATING ELECTRIC CURRENT.

993,669.          Specification of Letters Patent.          Patented May 30, 1911.

Application filed March 7, 1910. Serial No. 547,778.

*To all whom it may concern:*

Be it known that I, JOSEPH AUGUSTINE FAGUY, resident of 158 Breboeuf street, in the city and district of Montreal, in the Province of Quebec, in the Dominion of Canada, subject of the King of Great Britain, have invented certain new and useful Improvements in Power Transmission from a Car-Axle for Generating Electric Current; and I do hereby declare that the following is a full, clear, and exact description of the same.

The invention relates to improvements in power transmission from a car axle for generating electric current, as described in the present specification and illustrated in the accompanying drawings that form part of the same.

The invention consists essentially in the novel construction and arrangement of parts, whereby an electric generator suitably supported is driven by power transmitted from the axle through a flexible connection with one end of the axle.

The objects of the invention are to increase the efficiency of the generator by insuring a constant generation of current while the train is in motion and thus obviate the troubles incident to irregular drives, to eliminate the use of belts as a power transmitting means from the axle to the generator, and generally to devise a simple, compact and durable electric equipment for the generation of current for lighting and other uses within the car.

In the drawings, Figure 1 is a sectional view of a portion of a car body, showing an electric generator attached to the under side thereof, and a power transmitting device beneath the generator partially in section and attached to the axle of the car. Fig. 2 is a vertical sectional view on the line A—B in Fig. 1, looking outwardly. Fig. 3 is a vertical sectional view on the line A—B in Fig. 1, looking inwardly. Fig. 4 is an enlarged sectional view of the axle end and a member of the transmission coupling attached thereto.

Like numerals of reference indicate corresponding parts in each figure.

Referring to the drawings, 1 is the car body.

2 is a plate rigidly secured to the underside of the car body at one side thereof and having projecting centrally therefrom one member of the ball joint 3.

4 is an electric generator having projecting upwardly and centrally from its top side, the other member of the ball joint 3, thus suspending said electric generator 4 from the body of the car by a flexible connection.

5 are cushion springs introduced between the top side of the electric generator and the plate 2. The particular form of suspension of the said electric generator from the car body is important, but not essential to the invention, as it may be supported in many other ways, in fact the support from the said car body of said generator may be quite rigid without departing from the spirit of the invention.

6 is the armature shaft. 7 is a bevel pinion, mounted on the lower end of the said armature shaft 6.

8 is the gear case having the flanges 9 rigidly secured to the under side of the generator 4 and divided in the interior thereof into the pinion chamber 10 and the gear chamber 11.

12 and 13 are bearing orifices in alinement in the sides of the gear chamber 11. 14 and 15 are bushings in said bearing orifices.

16 is a bearing in the pinion chamber 12 for the lower end of the armature shaft 6.

17 is the gear shaft journaled in the bushings 14 and 15 and having the flanged outer end 18.

19 is a collar mounted on the inner end of the shaft 17 to the outside of the bushing 14 and having one member of the universal joint 20 extending therefrom.

21 is one section of a telescopic shaft having at one end thereof the other member of the universal joint 20 and at the other end the reduced portion 22. 23 is the other and hollow section of the telescopic shaft having one member of the universal joint 24 at one end and receiving the reduced part 22 of the section 21 in the other and hollow end.

The reduced portion 22 may be squared or else there may be a key-way and feather to insure the rotation of both parts together.

25 is a cap having the second member of the universal joint 24 projecting centrally from its outer side and the recessed inner side 26, and also in its outer side the threaded holes 27 in the bottom of which are the bolt holes 28 through said cap.

29 is the axle having the flanged end 30 as usual, onto which fits the cap 25 and the threaded holes 31 in alinement with the bolt holes 28 in said cap.

32 are bolts having the threaded ends 33 inserted in the threaded holes 31 and the heads 34 abutting the bottom of the holes 27.

35 are threaded plugs screwing into threaded holes 27 and locking said bolts firmly within said holes, so that the cap 25 is rigidly secured on the axle and practically makes an enlarged flanged end to said axle. 36 is a journal box in which said axle 29 turns as customary. 37 are the covers to the opening into the said journal box, pivoted at 38 and folding to each side of the cap 25.

39 is a bevel gear wheel fixedly mounted on the shaft 17 within the gear chamber 11 and coacting with the pinion 7, said gear being rotated by the rotation of the car axle 29 through the telescopic shaft. 40 are oil rings suspended on the shaft 17 on each side of said gear wheel and hanging down into the bottom of the gear case which forms an oil well.

In the operation of this invention, as the car travels, the axle 29 is rotated, which rotates the cap 25 and consequently the telescopic shaft and the gear shaft 17. This rotates the gear wheel 39, which coacts with the pinion 7, thus driving the armature shaft 6 and generating current. During the travel of the car, the truck of said car will, of course, swing on its pivot on rounding curves, besides, will to a certain extent jump, in other words, the said truck of the car is that portion of said car, which gets all the movement caused by any unevenness in the railway or curves of the same and the result of this is that the end of the axle, on which the cap 25 is secured, moves in various directions, therefore in order not to interfere with the successful transmission of power to the electric generator, the joints 20 and 24 are provided as also the telescopic shaft. This arrangement as a general rule takes care of all the different positions of the end of the axle, but to still further insure the successful operation, the generator is flexibly suspended and moves sufficiently to relieve to a certain extent the flexible connection formed by the telescopic shaft and joints. In this connection, it may be advisable to extend rods 41 from the generator to the truck frame, these rods will be arranged in any suitable way and just merely form a connection between said truck and said generator, so that the generator frame must move with every movement of the truck, however, it is entirely optional in regard to the use of these rods, though under some conditions they may be found quite an important detail of construction.

It must be understood that this invention is not at all confined to the details of construction, as set forth herein, as many modifications may be made in the various parts, the salient feature being the transmission of power from the axle end to a generator supported either from the car body or from the truck, though it is obvious that the car body is the most acceptable place from which to suspend said generator.

What I claim as my invention is:

1. In power transmission from a car axle for generating electric current, the combination with a car axle, an electric generator suitably supported and a gear drive supported from said generator, of flexible means connecting said gear drive to the end of the said axle for transmitting power from the latter.

2. In power transmission from a car axle for generating electric current, the combination with a car axle, an electric generator suitably supported and a gear drive supported from said generator, of a flexible shaft connecting the end of said axle with said gear drive.

3. In power transmission from a car axle for generating electric current, the combination with a car axle, an electric generator suitably supported and a gear drive supported from said generator, of a telescopic shaft, and a plurality of universal joints connecting said shaft to the end of said axle and to said gear drive.

4. In power transmission from a car axle for generating electric current, the combination with a car axle, an electric generator suitably supported and a gear drive supported from said generator, of an extensible shaft, a cap rigidly secured to the end of the axle, and universal joints joining said extensible shaft to said cap and to said gear drive respectively.

5. In power transmission from a car axle for generating electric current, the combination with a car axle, an electric generator suitably supported and a gear drive supported from said generator, of an extensible shaft, a cap having a recessed inner side and mounted on the end of said axle, bolts securing said cap to said axle, and universal joints joining said shaft to said cap and to said gear drive respectively.

6. In power transmission from a car axle for generating electric current, the combination with a car axle, an electric generator suitably supported and a gear drive supported from said generator, of an extensible shaft, a cap having a recessed inner side and threaded holes in the outer side and bolt holes therethrough, bolts extending through said bolt holes into said axle and threaded plugs inserted in said threaded holes and abutting the heads of said bolts, and universal joints joining said shaft to said cap and to said gear drive respectively.

7. In power transmission from a car axle for generating electric current, the combination with a car axle, a journal box having a circular opening in the lid thereof, an electric generator and a gear drive supported from said generator, of a circular cap rigidly secured to the end of said axle and turning in said circular opening of the lid of said journal box and flexible power transmitting means joining said cap and gear drive.

8. In a device of the class described, in combination, a car body, an electric generator flexibly supported therefrom, a gear drive supported from said generator, a car axle, flexible means connected to the end of said car axle for transmitting power therefrom to said gear drive.

9. In a device of the class described, in combination, a car body, an electric generator flexibly supported therefrom, a gear drive supported from said generator, a car axle, an extensible shaft, and universal joints connecting said extensible shaft to the end of said car axle and to said gear drive.

10. In a device of the class described, in combination, a car body, an electric generator flexibly supported therefrom, a gear drive supported from said generator, an extensible shaft, a cap rigidly secured to the end of said axle, a journal box inclosing the end of said axle and having a lid encircling said cap, and flexible connections joining said shaft to said cap and to said gear drive respectively.

11. In a device of the class described, in combination, a car body, an electric generator, a flexible joint supporting said generator from said car body, a gear drive supported from said generator, a car axle, and flexible means connecting the end of said axle with said gear drive for transmitting power from said axle to said drive.

12. In a device of the class described, in combination, a car body, a flexible joint supporting said generator from said car body, resilient means between said generator and said car body for cushioning the former, a gear drive supported from said generator, a car axle, and flexible means connecting the end of said axle with said drive for transmitting power from said axle to said drive.

13. In a device of the class described, a car body, an electric generator, a flexible joint supporting said generator from said car body, means to one side of said joint for cushioning said generator from said car body, a car truck, rods extending from the frame of said truck to said generator, a gear drive supported from said generator and flexible means from the end of an axle in said truck to said gear drive for transmitting power from said axle to said drive.

14. In a device of the class described, in combination, a car body, an electric generator supported from the under side of said car body, a gear case rigidly secured to the lower end of said generator and having a pinion chamber and a vertical gear chamber and bearings in the sides of said gear chamber, a gear shaft journaled in said bearings, a gear wheel mounted on said shaft and turning in said gear chamber, a pinion mounted on the armature shaft of the generator, a car axle, and a flexible connection from the end of said car axle to said gear shaft for transmitting power from said axle to said gears.

15. In a device of the class described, in combination, a car body, a generator supported from the under side of said car body, a gear case rigidly secured to the under side of said generator having a pinion chamber and a vertical gear chamber, bearings in the sides of said gear chamber, a gear shaft journaled in said bearings, a gear mounted on said shaft, ring oilers depending from said shaft, a pinion mounted on the armature shaft of the dynamo coacting with said gear wheel, a car axle, a telescopic shaft, and universal joints joining said telescopic shaft to the end of said axle and to one end of said gear shaft respectively.

16. In a device of the class described, in combination, a car body, an electric generator secured to the under side of said car body, a gear case rigidly secured to the under side of said generator having a pinion chamber and a gear chamber and bearings in the sides of said gear chamber, a gear shaft journaled in said bearings and having one member of the universal joint from its inner end, a gear wheel mounted on said gear shaft, a pinion mounted on the armature shaft of the generator, a car axle, a cap rigidly secured to the end of said car axle and having one member of a universal joint, and a telescopic shaft having at each end thereof the other members of the universal joints connecting said shaft to said cap and to said gear shaft respectively.

Signed at the city and district of Montreal, Quebec, Canada, this 18th day of February, 1910.

JOSEPH AUGUSTINE FAGUY.

Witnesses:
G. H. TRESIDDER,
P. SKEE.